United States Patent [19]
Hiemstra

[11] Patent Number: 5,112,219
[45] Date of Patent: May 12, 1992

[54] DUAL MIXING GAS BURNER

[75] Inventor: Scott Hiemstra, Colorado Springs, Colo.

[73] Assignee: Rocky Mountain Emprise, Inc., Colorado Springs, Colo.

[21] Appl. No.: 582,485

[22] Filed: Sep. 14, 1990

[51] Int. Cl.$^5$ .......................... B05B 7/00; F23D 14/48
[52] U.S. Cl. ...................... 431/354; 239/424; 239/424.5
[58] Field of Search .......... 431/7, 8, 345, 354, 431/350, 326, 328, 344; 239/416.4, 416.5, 424, 424.5, 290

[56] References Cited

U.S. PATENT DOCUMENTS

| 1,723,667 | 8/1929 | Traub | 239/424 |
| 2,869,632 | 1/1959 | Bornkessel | 239/424 X |
| 2,911,035 | 11/1959 | Nieman et al. | 431/354 X |
| 3,204,682 | 9/1965 | Teleshefsky et al. | 431/354 X |
| 3,488,951 | 1/1970 | Chamberlain et al. | 239/424 X |
| 4,320,874 | 3/1982 | Leinberger et al. | 239/424 |

FOREIGN PATENT DOCUMENTS 1502413  3/1978  United Kingdom ............ 431/8

*Primary Examiner*—Carl D. Price
*Attorney, Agent, or Firm*—William E. Hein

[57] ABSTRACT

A dual mixing gas burner comprises a cylindrical or other shaped housing having a flat front burner surface and a flat rear surface. A fuel gas chamber and two oxygen chambers are located within the housing. A central oxygen jet conveys oxygen gas from the first oxygen chamber to the front burner surface. A fuel gas jet, coaxially positioned with and surrounding the central oxygen jet, conveys fuel gas from the fuel gas chamber to an annular area on the front burner surface around the central oxygen jet. An outer oxygen jet, coaxially positioned with and surrounding the fuel gas jet, conveys oxygen gas from the second oxygen chamber to an annular area on the front burner surface around the fuel gas jet. Any number of the above combinations of a central oxygen jet, fuel gas jet, and outer oxygen jet may be provided to convey oxygen gas and fuel gas to the front burner surface. Ports for the entry of oxygen gas and fuel gas may be located on a side surface or on the flat rear surface of the housing of the gas burner.

3 Claims, 2 Drawing Sheets

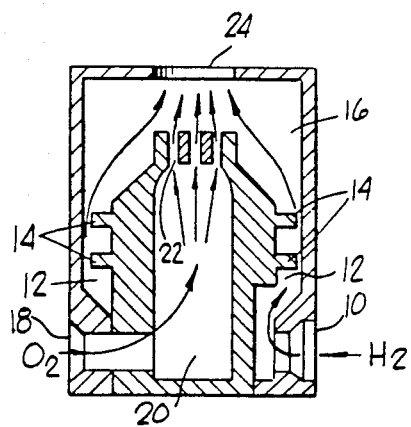
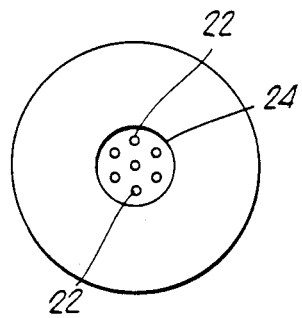
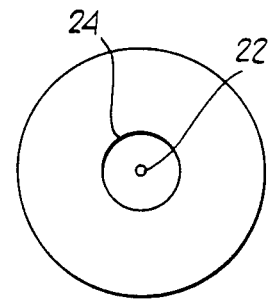
FIG.1A (PRIOR ART)  FIG.1B  FIG.1C
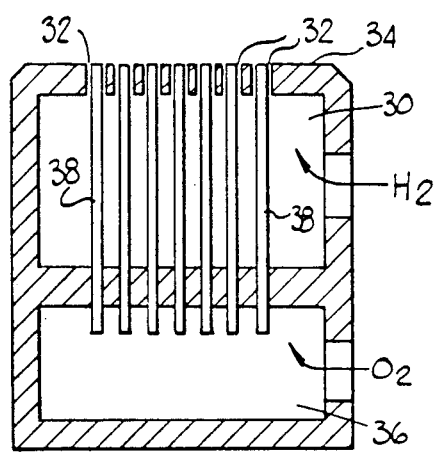
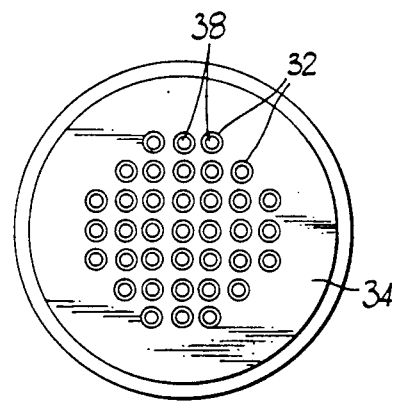
FIG.2A (PRIOR ART)  FIG.2B
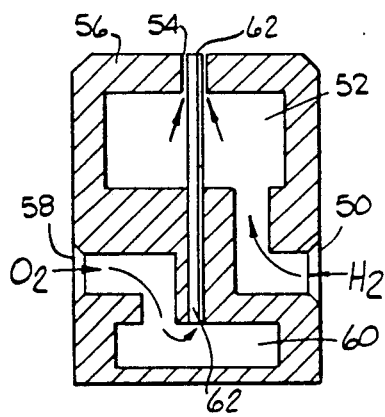
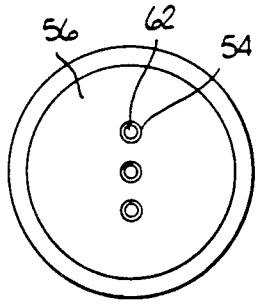
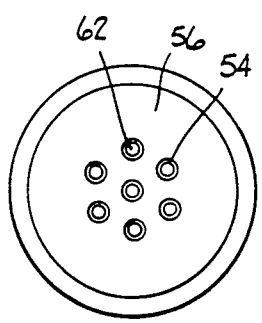
FIG.3A (PRIOR ART)  FIG.3B  FIG.3C

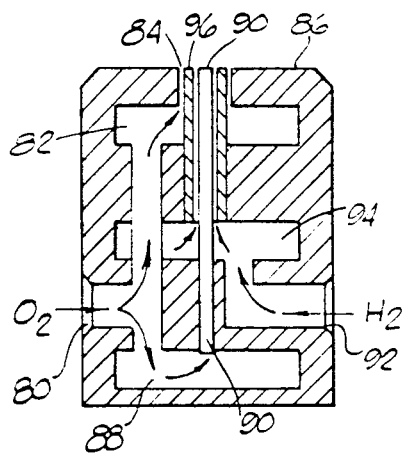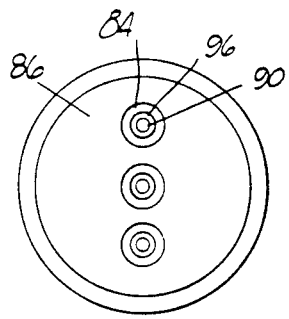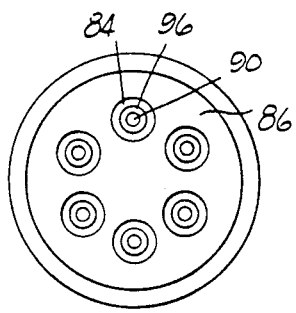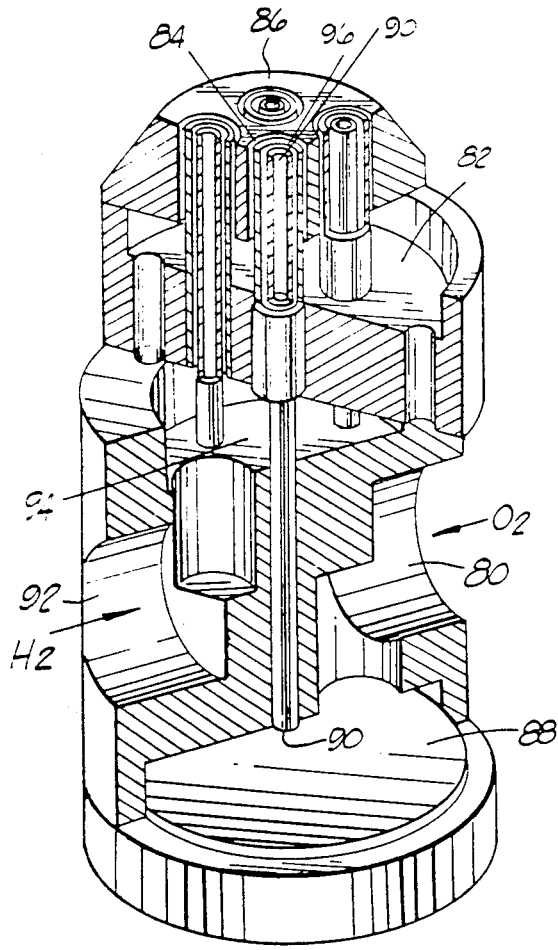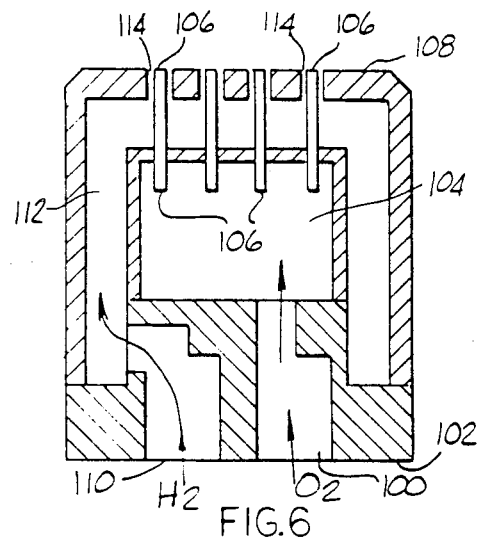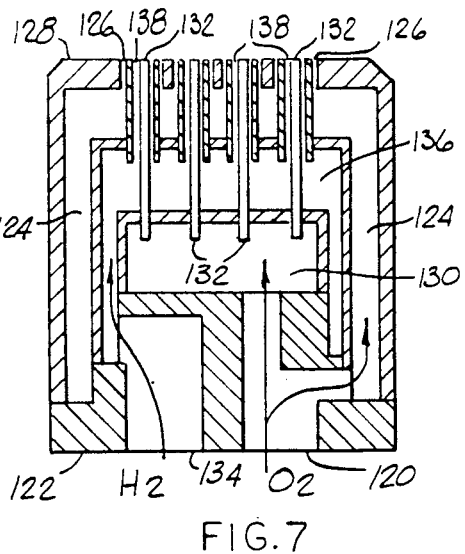

DUAL MIXING GAS BURNER

BACKGROUND AND SUMMARY OF THE INVENTION

This invention relates generally to the glass blowing arts and more specifically to an improved dual mixing gas burner for use in those arts.

For many years, the standard lathe ring burner used in the glass blowing industry has been of the types marketed by Litton Engineering Laboratories and by Carlisle Machine Works. Originally designed as semi-surface mix burners for natural gas and propane, these prior art burners have been used extensively for working the new higher temperature boro-silicate glasses. With the birth of the semiconductor industry in 1964 and the subsequent wide use of silica and clear fused quartz as important industrial glasses, the Litton burner has been used with hydrogen gas to obtain the extremely high working temperatures that these glasses require. The growth of semiconductor technology through successive generations of larger and larger silicon wafers brought about the requirement for larger quartz tubing diameters. With the development of good quality large diameter quartz tubing came the need for larger gas burners with which to work it. The typical response to this need was to make the standard ring burner larger. The typical glass shop work horse burner of 1970 was a ring burner with eight single jet heads or six seven jet heads, while now that burner has grown to one with twelve or fourteen seven jet heads and, even at that size, it is hard pressed to develop the heat densities required to comfortably work the larger diameter tubes.

These prior art Litton burner heads, available in both single and seven-jet configurations, are simple press-fit systems with side ports for the introduction of oxygen and fuel gas. The fuel gas entering one side port flows into an annular region and is encouraged to disperse to a uniform density by means of baffles before entering the open mixing area at the top of the burner. Oxygen, entering from the other side port, flows to the center core of the burner and thence via one or seven small orifices into the mixing area. The combined gases, when ignited, exit the burner at the top opening. The mixing region of this burner can be defined as the interior of the cylinder formed by the surface connecting the top opening and the circumference of the center core nose. The flux of fuel gas passing through this surface becomes the amount of fuel available for combustion. Similarly, the amount of oxygen available for combustion is the flux passing through the surfaces defined by the orifice(s) in the nose of the center core. The mixing that occurs in this burner may thus be understood as two gases flowing through each other at more or less cross directions. Ideally, the gases are ignited, a well defined flame front is established at each oxygen jet orifice, and the resulting venturi tends to entrain any uncombusted gas into the flame. In practice, however, the diffusion characteristics of the mixed gases vary significantly.

In the case of standard hydrocarbon fuel gases, the coefficient of diffusivity is much less than that of oxygen. At any given time, the mixing process can be viewed as oxygen flowing from the orifice(s) and diffusing from that flow into a static field of fuel gas. Such a process should be very efficient as each molecule of fuel gas in the definite volume of the mixing area has a good chance of being met by oxygen molecules diffusing from the various flow jets.

In the case of hydrogen as a fuel gas, the situation is reversed. The diffusivity of hydrogen is about three and one-half times greater than that of oxygen. Thus, at any given time, the mixing process can be understood as a flux of hydrogen diffusing into well defined oxygen jets. As a rough gauge of the efficiency of mixing, one can calculate the probability of any given molecule of hydrogen diffusing into an oxygen jet. This probability is estimated by the proportion of the mixing region's defining surface area and the surface area of the oxygen jets. In the case of the Litton seven-jet burner, this probability is 63%. In practice, the measured efficiency of hydrogen combustion in this burner is somewhat better, due to the fact that mixing occurs by cross flow as well as by diffusion, by the venturi entrainment of some uncombusted hydrogen, and by entrainment of the surrounding atmosphere. Measured efficiencies range from 65% to 80%, depending on the oxygen mix of the flame. Various glass blowing procedures require different types of flames. Soft flames are generally associated with low gas flows and are rich in fuel. Hard flames tend to require high gas flows and are generally lean. Optimum heat transfer is usually associated with high flows and stoichiometric or slightly rich gas proportions. The 80% mixing efficiency in the Litton burner head occurs at optimal heat transfer conditions. In any case, a visual inspection of the flame shows a marked hydrogen envelope of uncombusted fuel. Given the high diffusivity of hydrogen compared to oxygen, it is impossible, given the mixing design of the Litton prior art burner, to completely burn the available fuel.

In contrast, another prior art burner, of the type marketed by American Gas Furnace Company (AGF), is a true surface mix or gas diffusion flame burner specifically designed to burn hydrogen gas. These burners consume huge volumes of hydrogen and produce sufficient heat to easily work quartz in diameters up to fourteen inches. While these burners are excellent for smooth build up procedures, they do not produce flames of sufficient sharpness or delicacy for most of the more typical lathe operations. That fact, their high cost resulting from nickel alloy Inconel construction needed to withstand the high radiant heat produced by white hot quartz, and the special fixed installations they require have limited their use to operations involving large diameter quartz tubing.

Unlike the Litton burner head in which the fuel gas and oxygen are semi-mixed before leaving the burner proper, the AGF burner is a true surface mix or diffusion flame burner in which gas mixing occurs outside the burner by the gases diffusing off stream into each other. Rather than introducing oxygen jets into a field of fuel gas, the flame produced by the AGF burner is a composite of several (16 to 177) single jets bound in a simple case. The hydrogen fuel is introduced into the top chamber and is allowed to flow through a given number of orifices in the face plate. Oxygen is directed into the bottom chamber and thence into hypodermic tubing that transports it to the center of each hydrogen orifice. There, given the overwhelming diffusivity of hydrogen over oxygen, the hydrogen diffuses into the center oxygen jet and also away from the center. Upon ignition, the several flame jets coalesce into one well defined flame. Any hydrogen that diffuses away from its jet center is presumably caught up in the flame of a neighboring jet. While this holds for jets in the interior of the flame, those jets around the periphery of the flame will lose a substantial portion of their available fuel. Maximizing the fuel combustion efficiency of these burners is a matter of maximizing the number of interior gas jets relative to the number of those on the perimeter.

More recently, Weiss Scientific Glassblowing and G.M. Associates have marketed a burner head that is a combination of the Litton burner head and the American Gas Furnace Company surface mix burner. These burner heads, generally known in the industry as Litton Replacements and available in three or seven jet configurations, have the advantages of fitting the standard Litton and Carlisle ring burners, have an improved flame geometry, generate an intense heat density, and are relatively quiet. They are significantly disadvantageous in that they waste a substantial amount of gas and heat. The seven-jet version, for example, produces a flame not dissimilar to a miniature version of the flame produced by the American Gas Furnace Company burner that is too wide, too hard, and too diffuse for most work. The three-jet version, on the other hand, produces a flame that is acceptable for most work, but fails to combust as much as one-half of the hydrogen gas flowing through it. While these Litton Replacement burner heads represent a significant advance in providing flames of sufficient quality to work large diameter quartz tubing, the wasted fuel and misdirected heat accompanying this generally improved performance represents a serious impediment to their acceptance in the industry.

These Litton Replacement burner heads are essentially miniature AGF burners designed to be fitted into the standard Litton and Carlisle ring burners. Again, hydrogen is directed into one side port, conveyed upward into a chamber and thence out the given number of orifices in the face plate. Oxygen is introduced into the opposite side port, conveyed downward into a chamber, and thence into hypodermic tubing to be transported to the center of the hydrogen orifice.

As noted above in the discussion of the AGF burner, the efficiency of combustion of these burner heads is dependent upon the probability of hydrogen diffusing away from the center of its flame jet to diffuse into another neighboring flame jet. The combustion efficiency of these burners is expected to be poor since nearly all of the jets lie on the perimeter of the flame. For example, in the seven-jet model marketed by G.M. Associates, the percentage of hydrogen diffusing away from the center of the three main jets is 66%. The percentage of hydrogen diffusing away from the center of the four minor jets is 75%. If roughly two-thirds of that outward diffusing fuel is lost at the jets on the permiter and none is lost at the center jet, then the overall combustion efficiency of the burner is about 59%. It is worse in the case of G.M. Associates' three-jet model, where two-thirds is a reasonable loss for the center jet, with a corresponding loss of five-sixths for the two outside jets. This results in an overall combustion efficiency of about 49%. The foregoing probability estimates are based on the nearest neighbor exposure typical of hexagonal close pack spacing. Again, in practice the measured efficiencies tend to be somewhat better due to the venturi induced entrainment of uncombusted gases. Measured efficiencies for the G.M. Associates three and seven jet models of the Litton Replacement burner are 52% and 60%, respectively, measured at optimum flows for maximum heat transfer.

The basic problem common to all of the prior art burners discussed above is that their designs fail to take into account fuel diffusivity. If the standard hydrocarbon gases are used as fuels, this design consideration is of no consequence, since the fuel tends to remain in the stream into which it is initially directed, and the oxidizer diffuses into it. Indeed, diffusion loss of oxygen presents no problem, since there is an adequate replacement supply in the surrounding atmosphere in which these flames generally burn. In the case of hydrogen as a fuel, the design defect is much more apparent. Hydrogen is expensive, and the loss of any fuel in an application where every bit of available heat is keenly appreciated is simply counterproductive.

If the loss of hydrogen by diffusion away from the flame jet is the major obstacle to optimal performance, a possible solution is to trap the hydrogen so that it cannot escape. One way of doing this would be to reverse the hydrogen and oxygen flows through the burner, resulting in injecting hydrogen into oxygen rather than vice versa. Then, the hydrogen has nowhere to diffuse other than into the oxygen, thus providing complete combustion. A large hand burner known in the prior art as the Multimix Torch available from Wale Apparatus, Inc. is typically run backwards by most glassblowers. That is, hydrogen is applied to the oxygen inlet, and oxygen is applied to the hydrogen inlet. This technique is somewhat useful, given the particular geometry of the Multmix Torch, but it does not work at all with the prior art burners discussed above. The reason that hydrogen is not generally injected into oxygen is that fuel diffusion and flame dynamics then operate at cross purposes. The flame front develops where the hydrogen diffuses into the oxygen with outward momentum. The flame sets up a venturi action that tends to contract the flame front with inward momentum. The result is a diffuse, unfocused flame front, low heat density, and poor transfer of heat from the flame to a glass workpiece.

It is therefore a principal object of the present invention to provide an improved hydrogen gas burner in which dual mixing of the applied gases is employed to provide improved heat transfer from the flame to the glass workpiece and to provide more complete combustion of the hydrogen fuel gas, resulting in a significant cost saving of expensive hydrogen gas.

It is a further object of the present invention to provide an improved hydrogen gas burner having a rear gas inlet configuration.

These and other objects are accomplished in accordance with the illustrated preferred embodiments of the present invention by providing a gas burner comprising a cylindrical or other shaped housing having a flat front burner surface and a flat rear surface. A fuel gas chamber and two oxygen chambers are located within the housing. A central oxygen jet conveys oxygen gas from the first oxygen chamber to the front burner surface. A fuel gas jet, coaxially positioned with and surrounding the central oxygen jet, conveys fuel gas from the fuel gas chamber to an annular area on the front burner surface around the central oxygen jet. An outer oxygen jet, coaxially positioned with and surrounding the fuel gas jet, conveys oxygen gas from the second oxygen chamber to an annular area on the front burner surface around the fuel gas jet. Any number of the above combinations of a central oxygen jet, fuel gas jet, and outer oxygen jet may be provided to convey oxygen gas and fuel gas to the front burner surface. Ports for the entry of oxygen gas and fuel gas may be located on the cylindrical surface or on the flat rear surface of the gas burner.

BRIEF DESCRIPTION OF THE DRAWINGS

FIGS. 1A-C are illustrations of a typical Litton prior art burner head.

FIGS. 2A-B are illustrations of a typical AGF prior art burner head.

FIGS. 3A-C are illustrations of a typical Litton replacement prior art burner head.

FIGS. 4A-C are illustrations of a dual mixing burner head constructed in accordance with the present invention.

FIG. 5 is a detailed multiple cross-sectional, three-dimensional diagram of the seven-jet dual mixing burner head of FIG. 4C.

FIG. 6 is an illustration of a single mixing burner head constructed in accordance with an alternative embodiment of the present invention in which the gas inlets are positioned on the rear surface thereof.

FIG. 7 is an illustration of a dual mixing burner head constructed in accordance with an alternative embodiment of the present invention in which the gas inlets are positioned on the rear surface thereof.

DETAILED DESCRIPTION OF THE INVENTION

Referring now to FIGS. 1A-C, there are shown typical prior art Litton burner heads discussed in detail above. Hydrogen fuel gas enters a side port 10 and flows into an annular region 12 where it disperses to a uniform density by means of a plurality of baffles 14 before entering an open mixing area 16 at the top of the burner. Oxygen enters the burner head at an opposite side port 18 and flows to a central chamber 20 and thence via either one or seven small orifices or jets 22 into the mixing area 16. The combined gases, when ignited, exit the burner head at the top opening 24. FIGS. 1B and 1C are top views of the prior art Litton burner of FIG. 1A in seven-jet single-jet configurations, respectively.

Referring now to FIGS. 2A-B, there is shown a typical prior art AGF burner head also discussed in detail above. Rather than introducing jets of oxygen into a field of hydrogen fuel gas as in the case of the prior art Litton burner of FIGS. 1A-C, the flame produced the by AGF burner head is a composite of a multiplicity of single jets. In the top view of FIG. 2B, a 37-jet configuration of this burner head is illustrated. The hydrogen fuel gas is introduced into an upper chamber 30 and is permitted to flow through a given number of annular hydrogen jets 32 in a top face plate 34. Oxygen is introduced into a lower chamber 36 and flows through tubes 38 to the center of each of the annular hydrogen jets 32.

Referring now to FIGS. 3A-C, there are shown typical prior art Litton replacement burner heads described above. FIGS. 3B and 3C are top views of the Litton replacement burner head of FIG. 3A in three-jet and seven-jet configurations, respectively. Hydrogen fuel gas is directed into a side port 50, conveyed upward into an upper chamber 52, and thence out a given number of annular hydrogen jets 54 in a top face plate 56. Oxygen is introduced into an opposite side port 58, into a lower chamber 60, and thence into a given number of tubes 62 that transport it to the center of each of the annular hydrogen jets 54.

Referring now to FIG. 4A, there is shown a dual mixing burner head constructed in accordance with the present invention. FIGS. 4B and 4C are top view of the burner head of FIG. 4A illustrating the positioning of the jets in three-jet and seven-jet configurations thereof. Oxygen is introduced into a side port 80, from which it flows into an upper oxygen chamber 82 and thence out a given number of outer annular oxygen jets 84 in a top face plate 86. Oxygen entering side port 80 also flows into a lower oxygen chamber 88, from which it flows into a given number of tubes 90 that transport it to the center of each of the outer annular oxygen jets 84. Hydrogen fuel gas enters an opposite side port 92, from which it flows into a chamber 94 and thence out a given number of inner annular hydrogen jets 96 that are coaxial with outer annular oxygen jets 84 and tubes 90. The three-dimensional details of the communication between the various internal chambers and tubes of the seven-jet burner head of FIG. 4C are shown in FIG. 5.

The dual mixing burner head of the present invention, as described above in connection with FIGS. 4A-C and 5, results in a jet of hydrogen being introduced between two jets of oxygen. This arrangement results in complete combustion of the available hydrogen, while retaining the well-defined, focused flame characteristic of prior art burner heads in which jets of oxygen are introduced into jets of hydrogen. In the prior art burner heads, in which jets of oxygen are introduced into jets of hydrogen, complete combustion of all of the available hydrogen is prevented, resulting in a substantial waste of costly hydrogen.

Referring now to FIG. 6, there is shown a single mixing burner head constructed in accordance with an alternative embodiment of the present invention in which the oxygen and hydrogen ports are located on the rear surface of the burner head. This configuration provides added convenience when mounting a number of individual burner heads on a conventional semi-circular burner ring for use on a lathe, for example. Oxygen enters a port 100 on a rear face 102 of the burner head. It then flows into an oxygen chamber 104 that is centrally located within the burner head and then into a given number of tubes 106 that provide the same number of central oxygen jets exiting a front face 108 of the burner head. Hydrogen fuel gas enters a port 110 that is adjacent port 100 on the rear face 102 of the burner head. It then flows into a hydrogen chamber 112 that surrounds oxygen chamber 104 and exits the front face 108 of the burner head in a number of annular hydrogen jets 114 surrounding each of the tubes 106.

Referring now to FIG. 7, there is shown a dual mixing burner head in which the oxygen and hydrogen ports are located on the rear surface of the burner head. Oxygen is introduced into a port 120 located on a rear face 122 of the burner head. Oxygen flows into an outer chamber 124, from which it then flows out a given number of outer annular oxygen jets 126 located in a top face plate 128. Oxygen entering rear port 120 also flows into a central oxygen chamber 130, from which it flows into a given number of tubes 132 that transport it to the center of each of the outer annular oxygen jets 126. Hydrogen fuel gas enters a port 134 that is adjacent port 120 on the rear face of the burner head. It then flows into a chamber 136 and thence out a given number of inner annular hydrogen jets 138 that are coaxial with tubes 132 and outer annular oxygen jets 126.

I claim:

1. A multiple-jet, dual mixing gas burner comprising:

housing means, said housing means having a flat front burner surface containing a multiplicity of jets, a flat rear surface, and at least one side surface;

an oxygen port located on said side surface for permitting entry of oxygen gas into the housing means;

a fuel gas port located on said side surface opposite said oxygen port for permitting entry of a fuel gas into the housing means;

first and second oxygen chambers within said housing means for receiving oxygen entering said housing means at said oxygen port, said first oxygen chamber being located adjacent said flat rear surface within said housing means and said second oxygen chamber being located adjacent said front burner surface within said housing means;

central oxygen jet means, associated with each of said multiplicity of jets, said central oxygen jet means being coupled between said first oxygen chamber and each of said multiplicity of jets contained on said front burner surface of said housing means for conveying oxygen gas from said first oxygen chamber to each of said multiplicity of jets contained on said front burner surface;

a fuel gas chamber within said housing means for receiving fuel gas entering said housing means at said fuel gas port, said fuel gas chamber being located between said first and second oxygen chambers within said housing means;

fuel gas jet means, coaxially positioned with and surrounding each of said central oxygen jet means associated with each of said multiplicity of jets, for conveying fuel gas from said fuel gas chamber to an annular area on said front burner surface around each of said central oxygen jet means associated with each of said multiplicity of jets; and outer oxygen jet means, coaxially positioned with and surrounding each of said fuel gas jet means, for conveying oxygen gas from said second oxygen chamber to an annular area on said front burner surface around each of said fuel gas jet means.

2. A dual mixing gas burner as in claim 1, further comprising a chamber passageway connecting said first and second oxygen chambers.

3. A dual mixing gas burner comprising:

housing means, said housing means having a flat front burner surface, a flat rear surface, and a cylindrical side surface;

an oxygen port located on said flat rear surface for permitting entry of oxygen gas into the housing means;

a fuel gas port located on said flat rear surface adjacent said oxygen port for permitting entry of a fuel gas into the housing means;

first and second oxygen chambers within said housing means for receiving oxygen entering said housing means at said oxygen port;

central oxygen jet means coupled between said first oxygen chamber and said front surface of said housing means for conveying oxygen gas from said first oxygen chamber to said front burner surface;

a fuel gas chamber within said housing means for receiving fuel gas entering said housing means at said fuel gas port;

fuel gas jet means, coaxially positioned with and surrounding said central oxygen jet means, for conveying fuel gas from said fuel gas chamber to an annular area on said front burner surface around said central oxygen jet means; and outer oxygen jet means, coaxially positioned with and surrounding said fuel gas jet means, for conveying oxygen gas from said second oxygen chamber to an annular area on said front burner surface around said fuel gas jet means;

said first oxygen chamber being centrally located within said housing mean, said second oxygen chamber being located adjacent said front burner surface within said housing means, and said fuel gas chamber being located between said first and second oxygen chambers within said housing means;

said first and second oxygen chambers and said fuel gas chamber being coaxially positioned with respect to each other, said fuel gas chamber including an annular portion surrounding said first oxygen chamber, and said second oxygen chamber including an annular portion surrounding said fuel gas chamber.

* * * * *